United States Patent [19]
Twigg

[11] Patent Number: 5,524,489
[45] Date of Patent: Jun. 11, 1996

[54] FLOATING MASS ACCELEROMETER

[75] Inventor: Robert D. Twigg, Seattle, Wash.

[73] Assignee: Plan B Enterprises, Inc., Seattle, Wash.

[21] Appl. No.: 198,867

[22] Filed: Feb. 18, 1994

[51] Int. Cl.$^6$ .................................................. G01P 15/08
[52] U.S. Cl. ..................... 73/514.38; 73/514.26
[58] Field of Search ........................ 73/493, 514.38, 73/514.26, 514.16; 340/669, 467; 200/61.45 R, 61.53

[56] References Cited

U.S. PATENT DOCUMENTS

| | | | |
|---|---|---|---|
| 2,078,616 | 4/1937 | Smith, Jr. | 73/517 R |
| 3,096,656 | 7/1963 | Jackson | 73/517 R |
| 3,713,343 | 1/1973 | Segerdahl | 73/517 R |
| 3,898,613 | 8/1975 | Nahikian et al. | 340/439 |
| 3,946,359 | 3/1976 | Henderson | 340/439 |
| 3,967,135 | 6/1976 | Balban et al. | 307/121 |
| 4,303,906 | 12/1981 | Weakley | 340/439 |
| 4,305,058 | 12/1981 | Baumann | 340/439 |
| 4,315,433 | 2/1982 | Edelmann | 73/517 R |
| 4,528,547 | 7/1985 | Rodney | 340/439 |

Primary Examiner—Hezron E. Williams
Assistant Examiner—Christine K. Oda
Attorney, Agent, or Firm—Stephen M. Evans; David L. Garrison

[57] ABSTRACT

A floating mass accelerometer having a plurality of curved elastic members tangentially contacting a mass that is supported by a low friction surface is disclosed. Proximity sensors are located adjacent the mass and provide an output based upon the distance between the sensor and the mass as regulated by the degree of elastic member compression or extension. Acceleration forces acting upon the mass cause the mass to move in response thereto, thereby causing deflection of at least one elastic member. The change in distance between the mass and at least one proximity sensor is relayed to a digital signal processor which processes the acceleration information and sends this information to a display and/or memory unit. In a preferred embodiment, a two axis accelerometer is disclosed wherein acceleration values greater than a predetermined level are stored in memory and may be recalled later to provide an indication as to acceleration forces encountered by the device. Alternative embodiments provide for an pre-impact monitor wherein a buffer holds acceleration information for the last time period; a shipping monitor wherein acceleration forces are time-tagged for later retrieval; a seismic monitor with an optional output relay capable of remote operations.

15 Claims, 8 Drawing Sheets

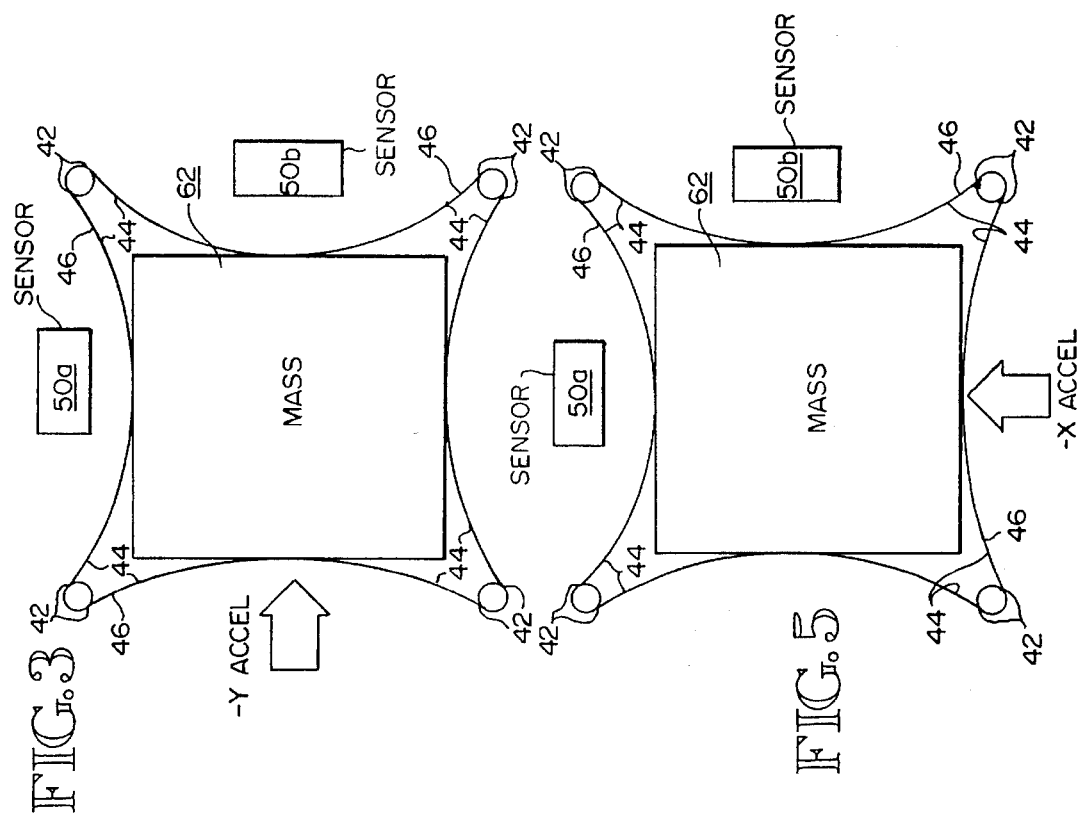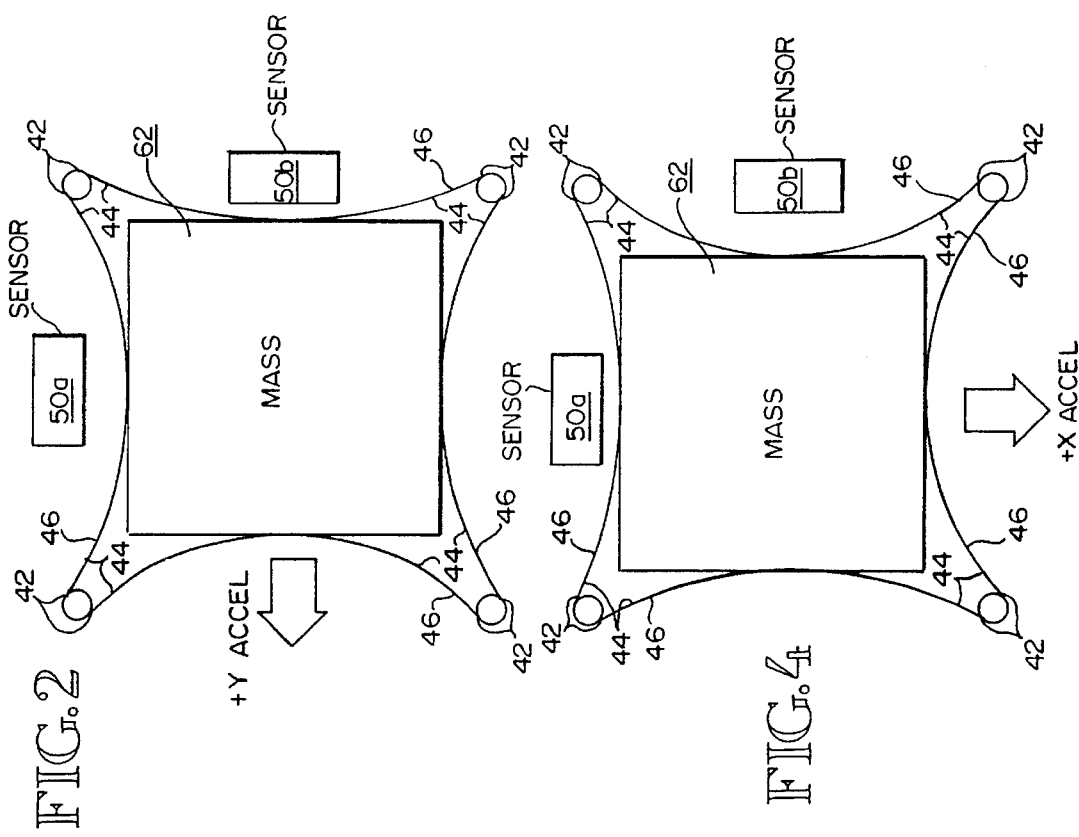

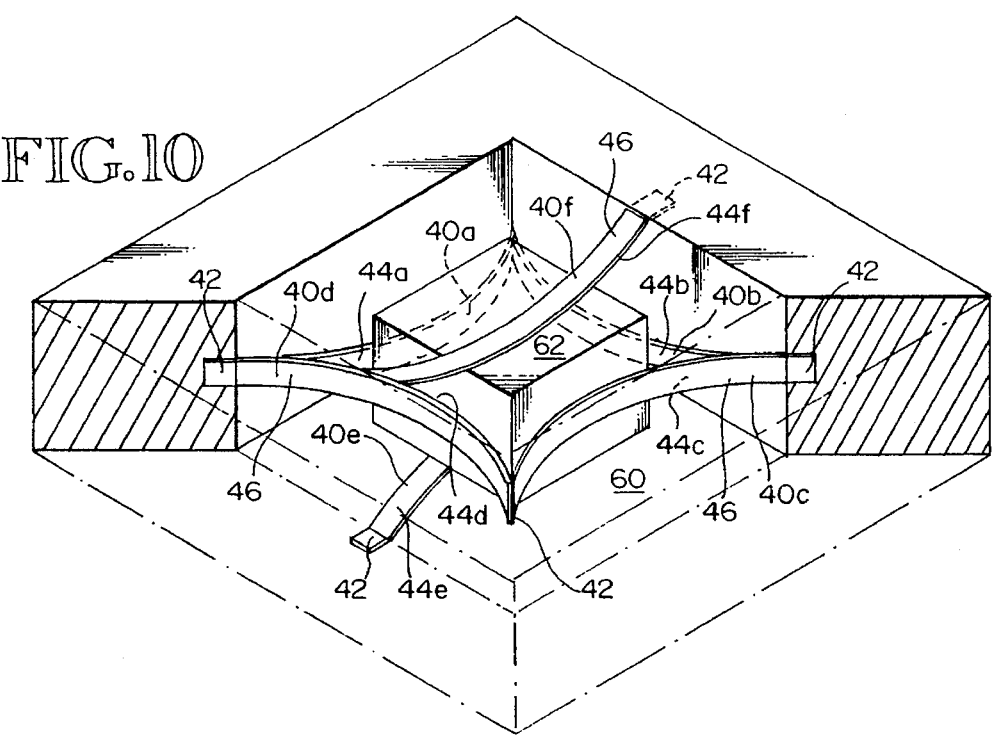
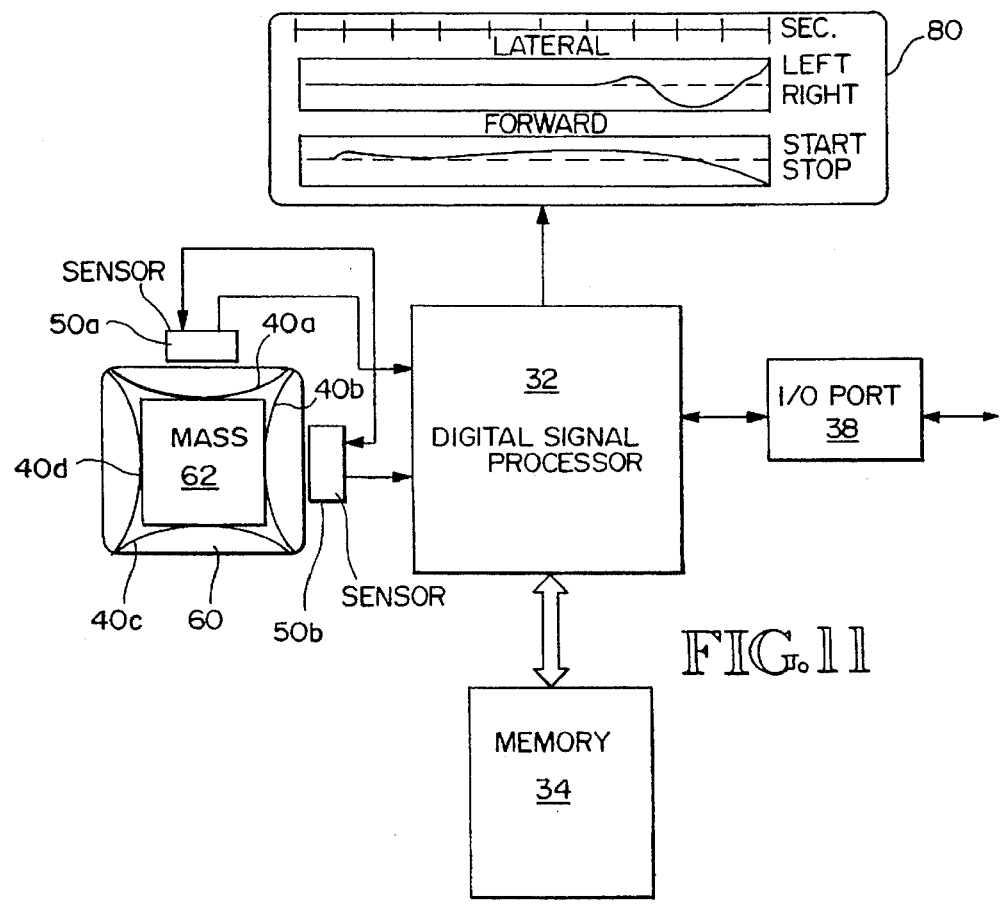

5,524,489

FLOATING MASS ACCELEROMETER

FIELD OF THE INVENTION

The present invention relates to the field of measuring instruments and more particularly to the field of opto-mechanical accelerometers.

BACKGROUND OF THE INVENTION

Instruments designed to measure acceleration of an object have been known and in use for many years. Some acceleration monitors measure an object's acceleration from a distance, i.e. the instruments are not in the same frame of reference as the object itself. Examples of these instruments include doppler type devices that measure the change in frequency per unit time of an emitted EM wave compared to the wave after having been reflected by the object, and frequency analyzers that measure the shift in frequency per unit time of an EM wave emitted by the object. Other devices do not rely on taking the derivative of the velocity (the change in velocity per unit time) but instead directly measure the resulting effect of acceleration on a body in the same frame of reference as the object. It is this method of measurement to which the present invention pertains.

SUMMARY OF THE INVENTION

In basic form, the present invention comprises a mass located on a surface wherein the mass and surface have a very low coefficient of friction therebetween. The mass is in compressive tangential contact with a first curved elastic member having an inboard and outboard surface and a spring constant associated therewith. Preferably, the point of tangential contact is at the apex of the inboard surface. Located adjacent the outboard surface of the first elastic member is a first proximity sensor. The first proximity sensor detects the distance between it and the outboard surface of the first elastic member, and provides an electromagnetic output generally proportional thereto.

An imaginary line drawn from the point of compressive tangential contact of the first elastic member to the center of mass of the mass should be parallel to the axis of acceleration to be measured. This imaginary line should correspond to the direction of acceleration to be monitored, although such an alignment is not necessary if the angle between the imaginary line and the vector of acceleration to be monitored is known and taken into consideration.

Low friction, off-axis prevention means are provided to retain the mass so that only movement of the mass in one direction (either arbitrary positive or arbitrary negative) is generally permitted. To ensure substantially linear response to mass movement, and to provide the option of measuring deceleration along the same axis as acceleration, a second, elastic member is placed in contact with the mass to provide a bias that urges the mass towards the first elastic member. Both elastic members are under a slight compressive load to insure that the first elastic member having the first proximity sensor associated therewith will extend or deflect in response to movement of the mass away from or towards the sensor without losing contact with the mass.

A more complex embodiment of the present invention provides for measurement of acceleration in two axes by replacing one or both of the off-axis prevention means with a third and/or fourth elastic member, at least one member being in compressive tangential contact with the mass and having a second proximity sensor associated therewith. Similarly, measurement of acceleration and deceleration in three axes is possible by modifying the two axis accelerometer so that the mass is entirely supported by elastic members, again one of which being in compressive tangential contact with the mass and having a third proximity sensor associated therewith.

To increase the utility of the invention and to provide a greater scope of applications, the output of a proximity sensor can be directed to a signal processor and preferably a Digital Signal Processor (DSP). The DSP can then perform desired processing tasks and direct output to either a memory device, a display, a signaling means, and/or a communications port. The functioning of the DSP can be controlled by real time external inputs such as switches or the like, or by internal soft/firmware.

The elastic members need only to have a known spring constant; any type of appropriate material having this property can be used with knowledge of the anticipated accelerations to be measured. Examples of elastic member materials include, but are not limited to, steel, spring steel, stainless steel, natural or man-made polymers, and the like. The one or more proximity sensors include, but are not limited to, optical, magnetic (Hall Effect), resistive, capacitive, or physically compressive (piezoelectric) based sensors.

To reduce the effects of static friction between the mass and either the elastic members or the prevention means, friction reducing coatings may be applied to expected areas of contact, the materials themselves may be chosen to have such properties, or additional structure such as micro ball bearings or the like may be added. In any event, it is desirable to reduce the effects of static friction or "stiction" so as to increase the linearity of acceleration measurement. In a preferred embodiment, Teflon® is applied to the mass, the support surface, and the inboard surfaces of the elastic members so as to reduce the coefficient of static friction ($\mu_s$) to about 0.04.

Output from the floating mass accelerometer can be processed by the DSP to provide an instantaneous output that may either be visual, audible, or both. In various embodiments, only accelerometer output correlating to critical accelerations will be subject to memory or audible/visual observations. Further embodiments utilize the accelerometer output to control external devices such as relays via a communications port. The basic structure as well as the invention's various embodiments will be discussed in more detail below.

BRIEF DESCRIPTION OF THE DRAWINGS

FIG. 2 shows the mass of FIG. 1 undergoing acceleration in the Y axis;

FIG. 3 shows the mass of FIG. 1 undergoing deceleration in the Y axis;

FIG. 4 shows the mass of FIG. 1 undergoing acceleration in the X axis;

FIG. 5 shows the mass of FIG. 1 undergoing deceleration in the X axis;

FIG. 10 is a simplified perspective view, in partial cutaway, of a three axis embodiment of the invention wherein the mass is entirely supported by elastic members;

FIG. 11 shows the essential components of the invention when used as a pre-impact monitor;

DETAILED DESCRIPTION OF THE INVENTION

Figure 1:
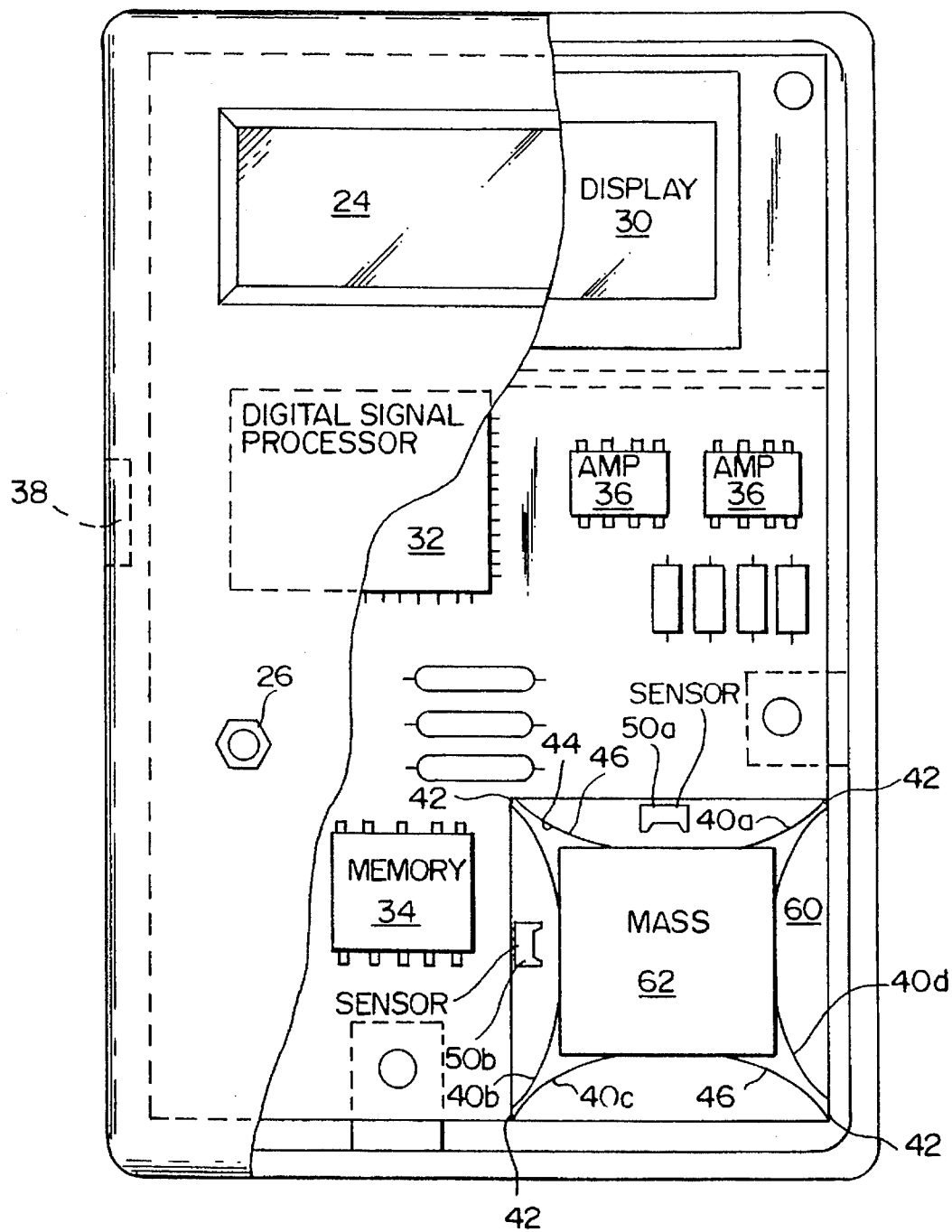
FIG. 1 shows a plan view in partial cutaway of a preferred embodiment of a two axis is accelerometer having a mass located on a low friction supporting surface and in compressive tangential contact with four curved elastic members with one proximity detector for each axis.

Reference is now made to the several figures wherein like numerals indicate like parts and more specifically to a two axis embodiment of the invention as illustrated in FIG. 1 wherein the basic components are shown. A low friction, generally planar supporting surface 60 is surrounded by four curved elastic members 40a–d (generically referred to as elastic member 40), with the ends generally referred to as 42 being fixedly attached to housing base 20. Each elastic member 40 has an operating range wherein the spring constant associated therewith is in fact constant so as to provide linear deflection in response to a constant acceleration force.

Located on surface 60 and within the confines of members 40a–d is mass 62. Mass 62 is sized and located so as to cause approximately 20–50% deflection of each member 40a–d within their operating range. In this manner, mass 62 is subject to compression forces from all elastic members 40, and can move in response to acceleration forces while still remaining in contact with each member 40. In a preferred embodiment, surface 60, mass 62, and inboard surfaces 44a-d of elastic members 40a–d are treated with a Teflon® coating to virtually eliminate relevant static friction or "stiction." It is to be understood that other types of stiction preventing coatings or treatments can be used and include oils, lubricants, bearings, vacuum, or air flow. By providing for a generally linear contact surface on mass 62, translation of mass 62 relative to any member 40 will not change the point of compressive tangential contact, thus ensuring that no matter what portion of mass 62 is in contact with a member 40, member 40 will continue to deflect predictably in response to acceleration forces causing movement of mass 62.

The invention further comprises a first and a second proximity sensor identified as sensors 50a and 50b. Sensor 50a is located adjacent to outboard surface 46a of member 40a and sensor 50b is located adjacent to outboard surface 46b of member 40b, it being understood that locating sensors 50a and 50b at any two adjacent sides is acceptable.

The sensitivity of the invention to changes in velocity (i.e. acceleration) can be modified by changing the spring constant of members 40a–d and/or changing the mass of mass 62. The spring constant of members 40a–d can be changed by altering the thickness or width of the member, or by changing its intrinsic properties such as its chemical composition. The spring constant may also be changed by increasing or decreasing the curvature of the elastic member. The choice of material for mass 62 is a design consideration and should be factored into any consideration of spring constants as it relates to sensitivity.

In a preferred embodiment of the invention, stainless steel or copper impregnated mylar strips of material are used. The strips measure approximately 1.05" by 0.163" and have a sectional thickness of approximately 0.002". Mass 62 consists of a generally square prism (0.72 $inch^2$ by 0.125 inch thick). While the shape of mass 62 does not have to be square, any shape chosen should provide only tangential contact with elastic members 40a–d so as to cause deflection thereof. Consequently, a mass having a complementary concave curve that was in contact with any member 40 would not cause the member to deflect as the member would behave similarly to a rigid arch and resist deflection. Furthermore, to avoid non-linear, off-axis output, the center of mass of mass 62 should be co-linear with the tangential contacts of members 40.

The described embodiment relies on acceleration forces on mass 62 to compress each member 40 to thereby provide a physical response, i.e. deflection of a member 40, that is monitored by a proximity sensor 50. Success has been found using an optical proximity sensor (OMRON EE-SF5) which provides precise voltage output changes in response to changes in proximity of a member 40. Each sensor 50 has an emitter 52 and a receiver 54. Light from emitter 52 is reflected by an elastic member 40 and received by receiver 54. The level of intensity of received light is inversely proportional to the square of the distance between sensor 50 and member 40. However, other proximity sensing means can be used. For example, a source of magnetic flux may be located on outboard surface 46 of a member 40 and Hall Effect sensors may then be located approximately in the position occupied by sensors 50. Another example includes the use of a strain gauge attached to a member 40. In each of these embodiments, the sensors provide usable output in proportion to sensor-to-member distance. Mass and member attributes are then chosen so as to use only the linear response output of any sensor/member combination.

FIGS. 2, 3, 4, and 5 illustrate a response by mass 62 when subject to acceleration forces as indicated. Attention is drawn to the fact that each member 40 remains in compressive, substantially tangential contact with mass 62 regardless of presented acceleration forces, thus ensuring substantially linear deflection by each member 40.

Figure 6:
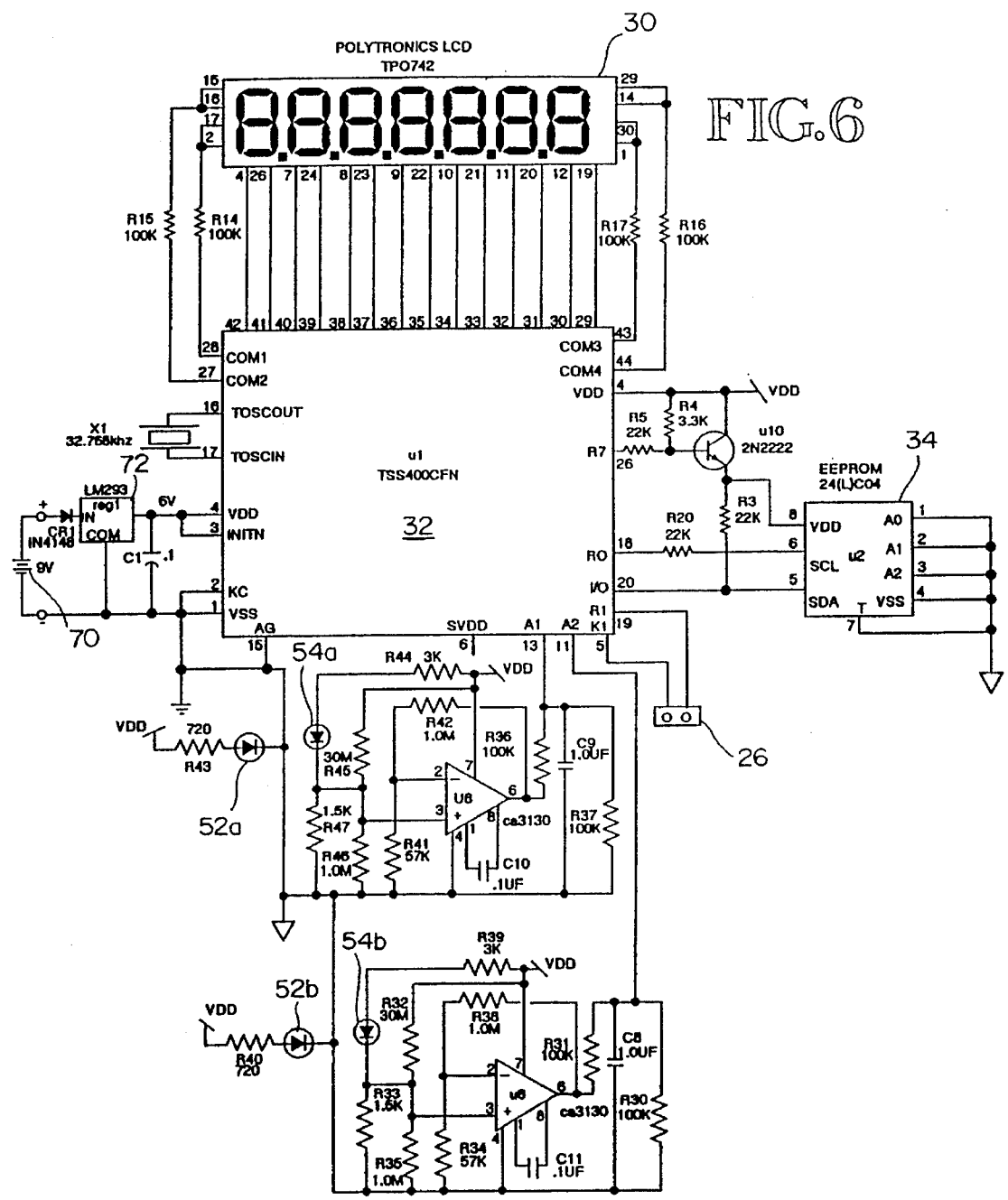
FIG. 6 is a schematic diagram of the electrical circuitry used for a two axis accelerometer.

In order to process and meaningfully present the output signals generated by sensors 50a and 50b, digital signal processor (DSP) 32, display 30, and memory 34 are used which are best shown in FIGS. 1 and 6. DSP 32 is preferably a Texas Instruments TSS400 sensor signal processor although any DSP can be used. More information on this processor can be found in T1 product bulletin number SLM001. Display 30 is a conventional LCD display such as manufactured by Polytronics as model number TPO742. Because DSP 32 has a built-in LCD driver, no additional display driver is needed. Memory 34 is a conventional Electrically Erasable Programmable Read Only Memory (EEPROM) device such as a 24C04. Up to 64 K of external EEPROM can be supported by the TSS400 processor. In the present embodiment, a 512 byte unit is used.

An electrical schematic of a two axis accelerometer according to the principles of the invention is shown in FIG. 6. A nine volt battery 70 supplies the necessary voltage to the components via voltage regulator 72. The distance between outboard surface 46 of elastic members 40a and 40b and proximity sensors 50a and 50b is proportional to the output voltage of each sensor 50 (see FIG. 1). This variable output voltage generated by sensors 50 in response to changes in the distance between a member 40 and a sensor 50 and filtered by C9, C8 is then amplified by CA3130 type amplifiers and directed to processor 32 inputs—A1 for x axis signals and A2 for y axis signals. Depending upon the programming of processor 32, output may be directed to digital display 30 and/or memory 34.

Operation

Figure 7:
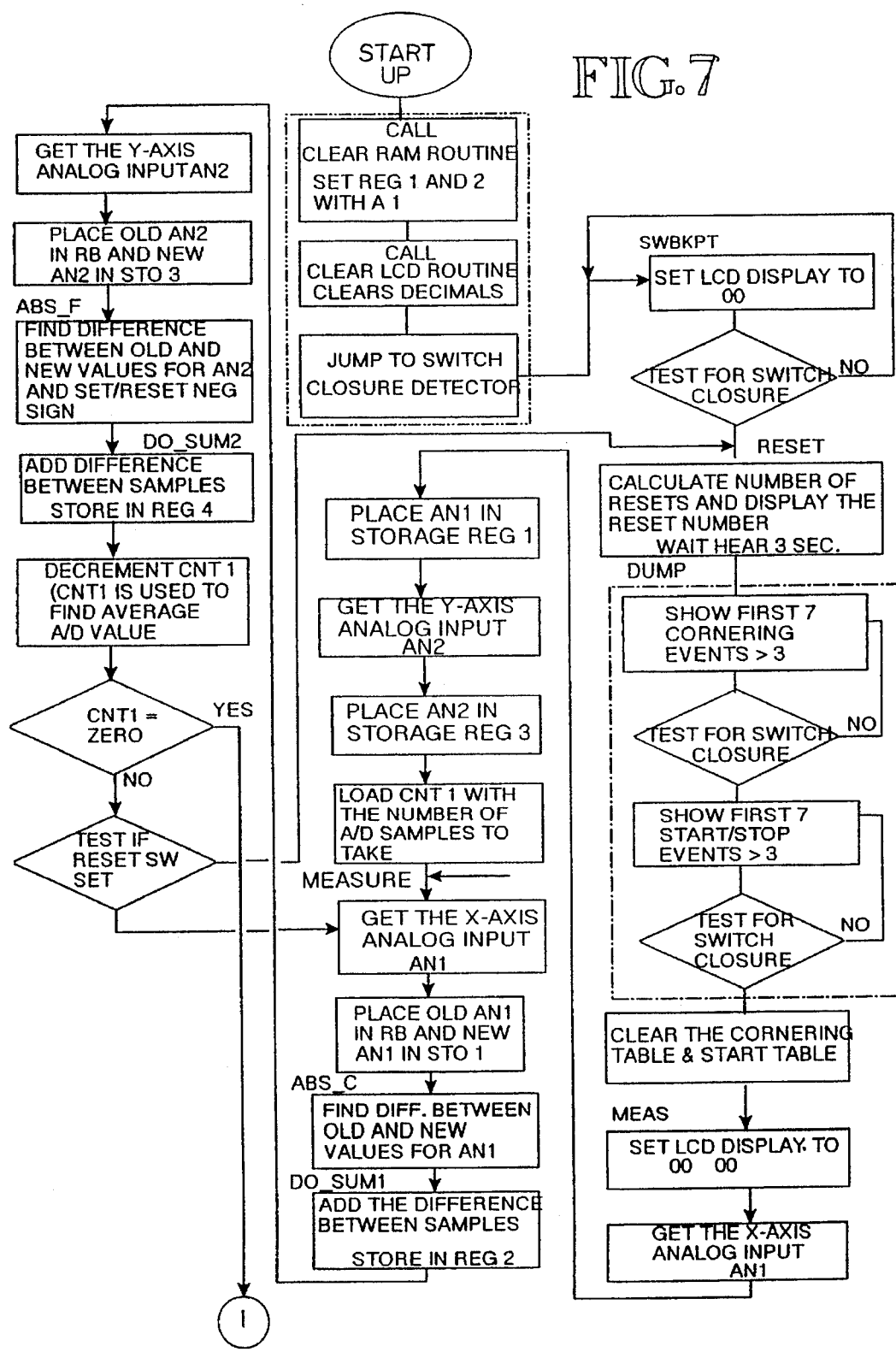
FIGS. 7, 8 and 9 show a flow diagram of the processing functions for the two axis accelerometer circuitry shown in FIG. 6.
Figure 8:
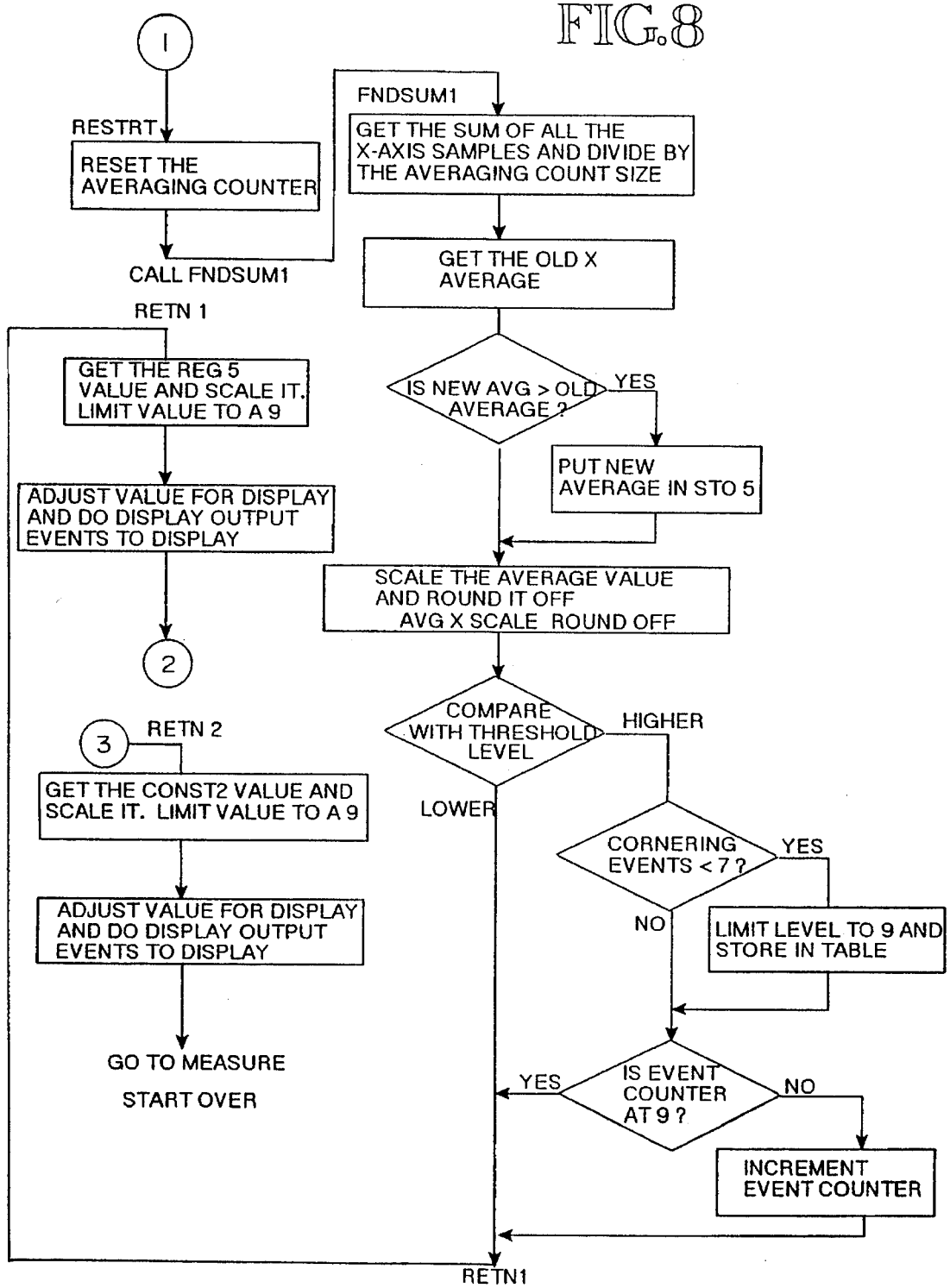
Figure 9:
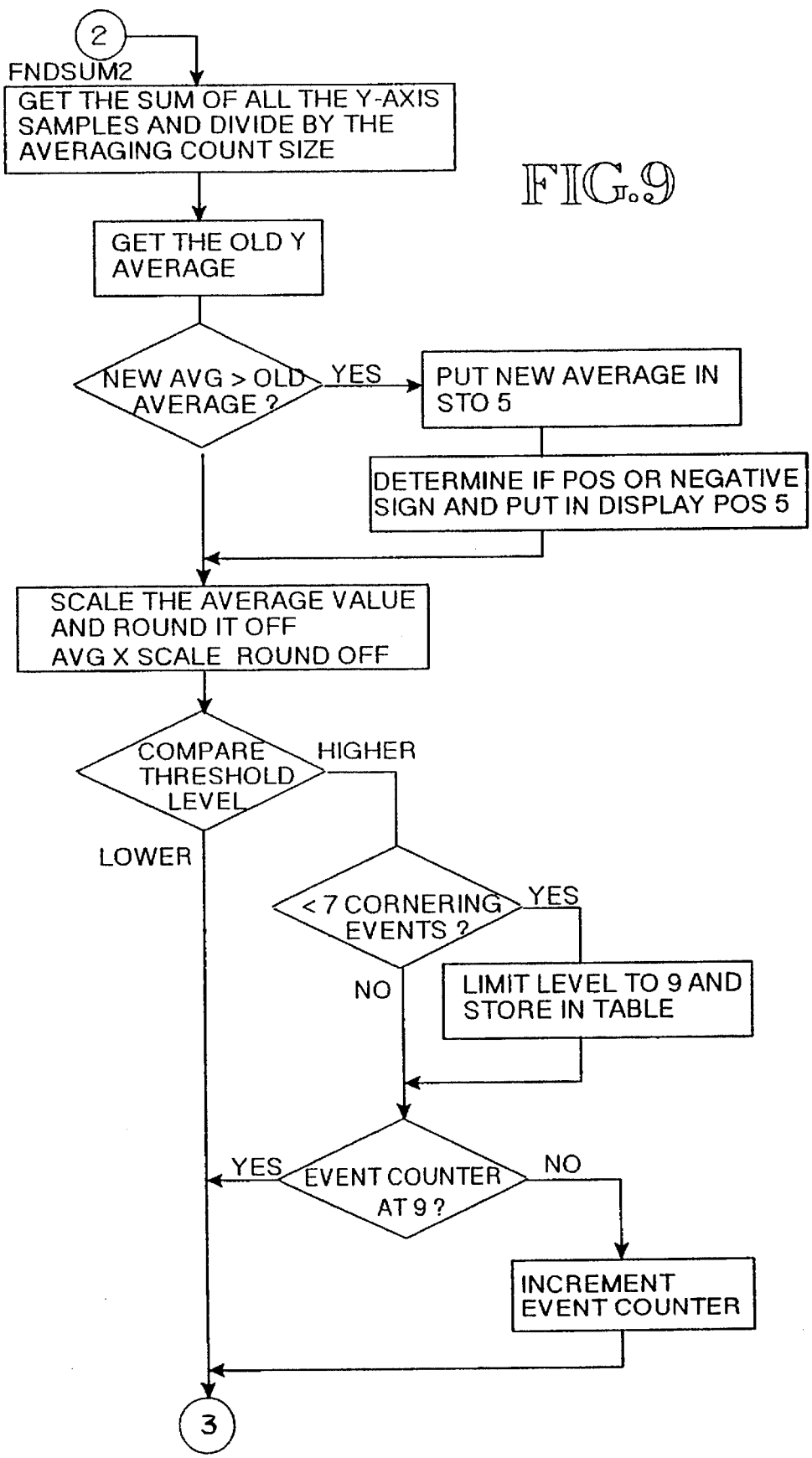

A flow diagram of the logic operations of processor 32 is shown in FIGS. 7, 8, and 9. When interpreted in view of FIG. 6, those persons skilled in the art should understand the processing logic of processor 32. Briefly stated, upon power up of the device, the startup routine is initiated and a check is made to see if switch 26 has been momentarily closed. If so closed, DSP 32 then calculates the number of device resets and displays the results for approximately three seconds and then shows the first 7 x axis accelerations having a value greater than three via display unit 30 until switch 26 is again momentarily closed at which time the first 7 y axis accelerations having a value greater than three will be displayed. Upon subsequent momentary closure of switch 26, both the data for x axis accelerations and y axis accelerations will be cleared and display 30 will show "00 00."

A value for x axis acceleration will be retrieved and stored into temporary memory first at register 1, and then a value for y axis acceleration will be retrieved and stored into temporary memory at register 3. A counter 1 is next loaded with the number of samples of acceleration to be taken. A new value for x and y axis accelerations is obtained and the two values for x axis acceleration are compared wherein the difference between the two values is added to register 2. The same process then occurs for y axis acceleration with the difference being added to register 4. Upon completion of this process loop, the counter value is decreased by one and the process is repeated until the counter value is zero.

After completing the predetermined number of loops as set by counter 1, the averaging counter is reset to zero and the sum of all x axis samples are divided by the number of samples to yield the average value of x acceleration. If the average of the new accelerations in the x axis are greater than any old x acceleration value, then the new value is stored in storage register 5 and the value is scaled, rounded, and then compared to a threshold level (for example any level greater than three). If the scaled value is equal to or greater than the threshold value, then the value is stored in memory 34, the event counter is increased by one, and the value is displayed on display 30. The same process is repeated with respect to y axis accelerations. If the event counter has exceeded a predetermined value of 9, then the value is displayed and y axis acceleration is processed, but the value is not stored to memory 34. After completing similar processing of y axis acceleration, the measurement processes is repeated. These operations continue until the unit is powered down.

Modifications

The described invention is capable of being modified into a three axis accelerometer by replacing surface 60 with an additional centrally located elastic member 40e and adding a sixth elastic member 40f so as to be in compressive tangential contact with mass 62 as is shown in FIG. 10. In this embodiment, mass 62 is entirely supported at all axes by members 40. To reduce friction problems, either a low friction coating such as Teflon® can be applied to the surfaces of mass 62 and to inboard surfaces 44a–f of elastic members 40a–f, and/or the entire assembly. Alternatively, the entire assembly can be encapsulated in a light, substantially transparent oil.

Applications

The present invention can be applied to a wide variety of applications. A preferred use for the invention is as a driver performance monitor. In this use, the unit is positioned substantially level in a vehicle and switched to the on state. As described above in reference to the processor logic operations of FIGS. 7, 8, and 9, the peak accelerations in the x and y axes will be stored and displayed. After switching the unit on, the display will show two closely spaced zeros. Pressing reset switch 26 will cause display unit 30 to show, for approximately 3 seconds, the number of times that the unit has been reset. By tracking the number of resets, a person can more easily determine if the unit has been intentionally reset so as to erase potentially critical driving record information.

After approximately 3 seconds has elapsed, display 30 will show either the first seven cornering events having a magnitude above a preset value, or all zeros if the unit has been reset. Pressing switch 26 again causes display unit 30 to show the first seven start/stop events having a magnitude above a preset value, or all zeros if the unit has been reset. By once again momentarily depressing switch 26, the internally stored driving record data is removed from memory 34 as confirmed by display unit 30 showing two sets of two zeros. The unit is now set in the measurement mode. Significant accelerations and decelerations will be displayed, with the first seven significant events for x axis and y axis being stored in memory.

An optional keypad entry device may be added to the unit to permit multiple driver monitoring for any given vehicle. Additional modifications include linking the unit to a transmitter so that acceleration data processed by the unit could be periodically relayed to a remote location.

The described driving monitor is believed to be useful by common carriers or fleet operators to monitor the performance of their drivers, or by parents when "loaning" their automobile to their dependents. Insurance companies may also be interested in such a device.

A variant of the performance monitor includes an expanded memory unit to continuously track accelerations for a given period of time on a first in, first out basis regardless of vehicle accelerations. In this manner, a continuously updated profile of vehicle acceleration is maintained until acceleration forces equivalent to those encountered in an accident or impact are encountered, at which time no new accelerations are added to memory. The length of the profile period is a function of the sampling rate and the size of memory. The raw data stored in the memory can be retrieved via a communication port associated with the processor and interpreted via appropriate software into a usable form such as by graph.

To illustrate this pre-impact application, FIG. 11 shows a collected data profile of a vehicle initially traveling straight forward. The vehicle then begins to make a right turn and quickly is turned left at the same time a sudden deceleration is recorded. The sudden change or impact in lateral direction or deceleration triggers the processor to stop recording new data so that a snapshot of the acceleration profile of the vehicle just prior to the impact is recorded into the memory. Subsequent analysis of the profile data could assist in determining the events leading to the impact, corroborate or contradict eye-witness testimony, and assist in establishing liability.

Figure 12:
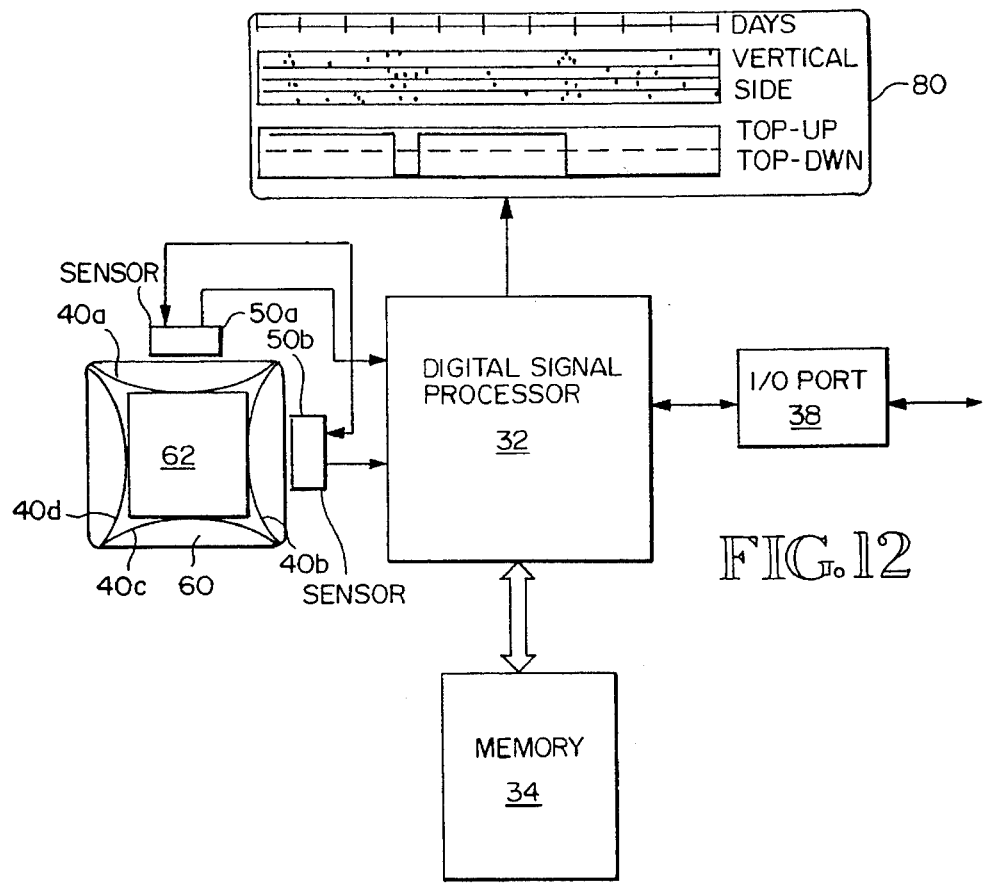
FIG. 12 shows the essential components of the invention when used as a shipping monitor.

A similar scheme can be employed to obtain an acceleration profile of an item being transported from one location to another. Unlike the impact monitor described above, the profile is historical from the moment it is initiated until the moment it is concluded. In operation, the unit is mounted to an object being shipped and any acceleration force encountered by the unit is time-tagged and stored into memory. After shipping, the memory of the unit is downloaded and graphically interpreted as best shown in FIG. 12. In this figure, the frequency and magnitude of lateral and vertical accelerations are monitored and logged to provide a shipping profile.

Figure 13:
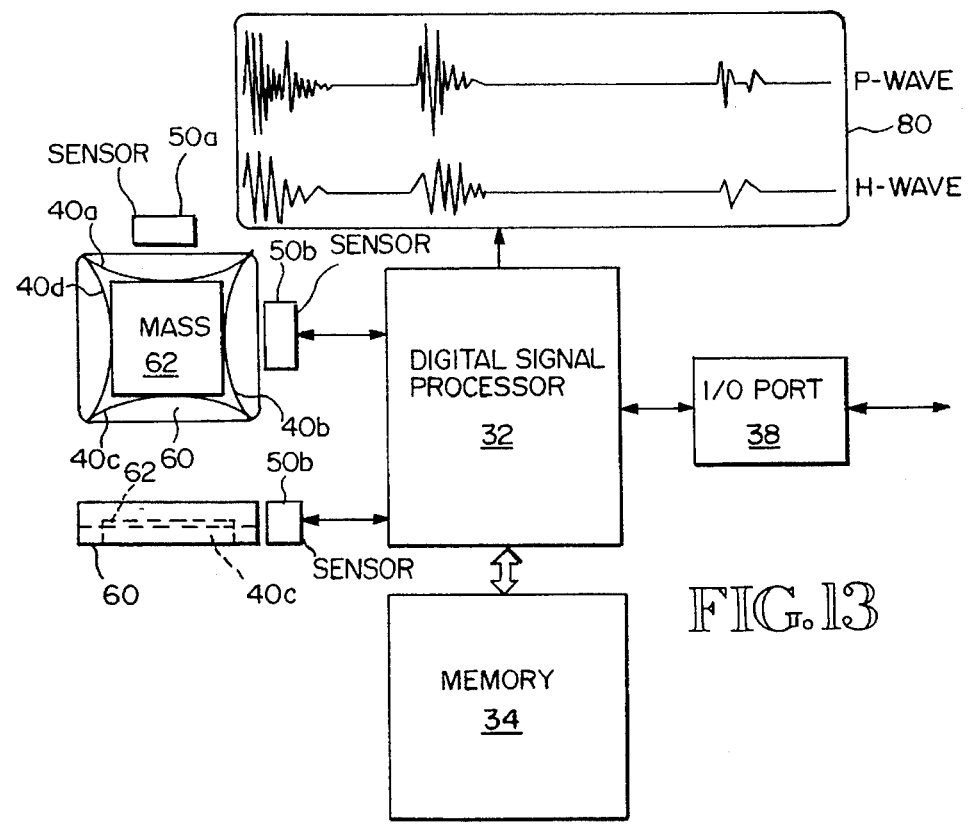
FIG. 13 shows the essential components of the invention when used as a seismic activities monitor.

The above-described units, either as is or in slightly modified form, may also be used in a variety of different applications. A unit may be placed in a water-borne vessel to monitor and record pitch, roll, and heave data. Similarly, the device can be modified to provide tilt information important in such industries as vessel stability and loan calculations and geophysical monitors. The spring constant of the elastic members may be altered to provide an extremely sensitive amateur seismometer for monitoring P and H waves as shown in FIG. 13. The same instrument may also be used for monitoring physical structure vibration such as might be encountered in bridges, tall buildings, or other wind or earthquake sensitive structures. Similarly, an analogous device can be attached to a machine housing or component thereof to determine the frequency and magnitude of vibrations.

The ability of the unit as shown in FIGS. 11, 12, and 13 to download acceleration information also permits it to operate slave devices in response to encountered accelerations. For example, by linking one or more remote-activated valves, accelerations encountered when monitoring physical phenomena could trigger a gas, water, or fuel line to close. Similar applications include linking a shut-off relay to the invention to stop a machine when excessive vibration is detected.

Industrial Applicability

The present invention will find use in any application wherein it is desired to monitor the acceleration forces encountered by the invention.

What is claimed is:

1. A same frame of reference accelerometer comprising:
   a supporting surface;
   a mass supported by the supporting surface;
   a first elastic member having a spring constant associated therewith wherein the first elastic member is in contact with the mass at a first contact point, whereby movement of the mass against the first elastic member causes resisted deflection thereof and the direction of deflection defines a first axis;
   a second elastic member having a spring constant associated therewith wherein the second member is in contact with the mass at a second contact point, whereby movement of the mass against the second elastic member causes resisted deflection thereof and the direction of deflection defines a second axis;
   a first off-axis prevention means positioned so as to prevent movement of the mass in a direction not collinear with the first axis and a second off-axis prevention means positioned so as to prevent movement of the mass in a direction not collinear with the second axis; and
   a first proximity sensor located proximate to the first elastic member wherein the first proximity sensor does not contact the mass and the first elastic member whereby the first proximity sensor provides information relating to the distance between the mass and the first proximity sensor.

2. The accelerometer of claim 1 wherein the first elastic member is in compressive tangential contact with the mass.

3. The accelerometer of claim 1 wherein the second elastic member is in compressive tangential contact with the mass.

4. The accelerometer of claim 1 wherein the first axis and the second axis are collinear.

5. The accelerometer of claim 1 wherein the first elastic member has an inboard surface and an outboard surface and the inboard surface is in compressive tangential contact with the mass.

6. The accelerometer of claim 1 for measuring accelerations in any direction within a plane of directions wherein the first and second axes are not collinear,
   wherein the first off-axis prevention means comprises a third elastic member having a spring constant associated therewith wherein the third member is in opposing contact, relative to the first elastic member, with the mass, whereby movement of the mass against the third elastic member causes resisted deflection thereof, and
   wherein the second off-axis prevention means comprises a fourth elastic member having a spring constant associated therewith wherein the fourth member is in opposing contact, relative to the second elastic member, with the mass, whereby movement of the mass against the fourth elastic member causes resisted deflection thereof, and
   further comprising a second proximity sensor located proximate to one of the second and fourth elastic members whereby the second proximity sensor provides information relating to the distance between the mass and the second proximity sensor.

7. The accelerometer of claim 6 wherein the first and third elastic members are in compressive tangential contact with the mass.

8. The accelerometer of claim 6 wherein the second and fourth elastic members are in compressive tangential contact with the mass.

9. The accelerometer of claim 6 wherein the first axis and the second axis are normal.

10. The accelerometer of claim 6 wherein the first and second elastic members have an inboard surface and an outboard surface and the inboard surface is in compressive tangential contact with the mass.

11. The accelerometer of claim 6 for measuring accelerations in any direction further comprising
    a fifth elastic member having a spring constant associated therewith and functionally takes the place of the supporting surface, wherein the fifth member is in contact with the mass at a fifth contact point, and whereby movement of the mass against the fifth elastic member causes resisted deflection thereof,
    a sixth elastic member having a spring constant associated therewith wherein the sixth member is in opposing contact, relative to the fifth elastic member, with the mass at a sixth contact point, whereby movement of the mass against the sixth elastic member causes resisted deflection thereof, and
    a third proximity sensor located proximate to one of the fifth and sixth elastic members whereby the third proximity sensor provides information relating to the distance between the mass and the third proximity sensor.

12. The accelerometer of claim 11 wherein the first, second, third, fourth, fifth, and sixth elastic member is in compressive tangential contact with the mass.

13. The accelerometer of claim 11 wherein the first axis is perpendicular to the second axis, and the third axis is normal to both the first and second axes.

14. A same frame of reference accelerometer comprising:

a supporting surface;

a mass supported by the supporting surface;

a first elastic member having a spring constant associated therewith wherein the first elastic member is in contact with the mass at a first contact point, whereby movement of the mass against the first elastic member causes resisted deflection thereof and the direction of deflection defines a first axis;

a second elastic member having a spring constant associated therewith wherein the second member is in contact with the mass at a second contact point, whereby movement of the mass against the second elastic member causes resisted deflection thereof and the direction of deflection defines a second axis;

a first off-axis prevention means positioned so as to prevent movement of the mass in a direction not collinear with the first axis and a second off-axis prevention means positioned so as to prevent movement of the mass in a direction not collinear with the second axis; and a first proximity sensor located proximate to the first elastic member whereby the first proximity sensor provides information relating to the distance between the mass and the first proximity sensor, wherein the mass has a non-conductive polymer coating.

15. The accelerometer of claim 14 wherein the first off-axis prevention means is a third elastic member and is in contact with the mass, and the second off-axis prevention means is a fourth elastic member and is in contact with the mass.

* * * * *